United States Patent
Enders et al.

(10) Patent No.: US 7,441,799 B2
(45) Date of Patent: Oct. 28, 2008

(54) NON-CIRCULAR STEERING WHEEL ASSEMBLY AND AIRBAG MODULE

(75) Inventors: Mark L. Enders, Pleasant View, UT (US); Richard Welford, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 370 days.

(21) Appl. No.: 10/731,489

(22) Filed: Dec. 8, 2003

(65) Prior Publication Data

US 2005/0121889 A1    Jun. 9, 2005

(51) Int. Cl.
*B60R 21/16* (2006.01)
(52) U.S. Cl. .................................... 280/731
(58) Field of Classification Search ............... 280/731, 280/728.3, 732; *B60R 21/09; B62D 1/11, B62D 1/181, 1/183*
See application file for complete search history.

(56) References Cited

U.S. PATENT DOCUMENTS

| | | | | |
|---|---|---|---|---|
| 2,215,677 A | * | 9/1940 | Walker | 74/552 |
| D221,070 S | | 7/1971 | Munter et al. | |
| D226,575 S | | 3/1973 | Ferdandez et al. | |
| 5,069,477 A | * | 12/1991 | Shiraki | 280/732 |
| 5,135,253 A | * | 8/1992 | Hirashima et al. | 280/732 |
| 5,470,097 A | * | 11/1995 | Elqadah et al. | 280/728.3 |
| 5,722,684 A | * | 3/1998 | Saderholm et al. | 280/728.3 |
| D406,804 S | | 3/1999 | Sacco et al. | |
| 6,153,996 A | * | 11/2000 | Nigrin et al. | 318/489 |
| 6,224,093 B1 | * | 5/2001 | Ochiai et al. | 280/731 |
| 6,357,785 B1 | * | 3/2002 | Heilig | 280/728.2 |
| 6,364,345 B1 | * | 4/2002 | Lang | 280/728.3 |
| D470,445 S | | 2/2003 | Wiedeman et al. | |
| 2001/0054812 A1 | * | 12/2001 | Sinnhuber | 280/731 |
| 2002/0089153 A1 | * | 7/2002 | Muller | 280/728.3 |
| 2002/0130492 A1 | * | 9/2002 | Webber et al. | 280/728.2 |
| 2005/0067819 A1 | * | 3/2005 | Segura | 280/732 |

FOREIGN PATENT DOCUMENTS

| | | | |
|---|---|---|---|
| FR | 2861657 A1 | * | 5/2005 |
| JP | 09039802 A | * | 2/1997 |
| JP | 10119693 A | * | 5/1998 |

* cited by examiner

*Primary Examiner*—Toan To
*Assistant Examiner*—Barry Gooden, Jr.
(74) *Attorney, Agent, or Firm*—Sally J Brown; Madson & Austin

(57) ABSTRACT

The application provides non-circular steering wheel designs and steering wheel-mounted airbag housings, cushions, and modules for use in vehicles using non-circular steering wheels. The airbag housings and modules of the invention provide supplemental reaction surfaces to support an airbag cushion mounted on a non-circular steering wheel. Airbag cushions of the invention utilize the steering wheel, steering column or steering wheel shroud as a partial reaction surface to support an airbag cushion.

16 Claims, 5 Drawing Sheets

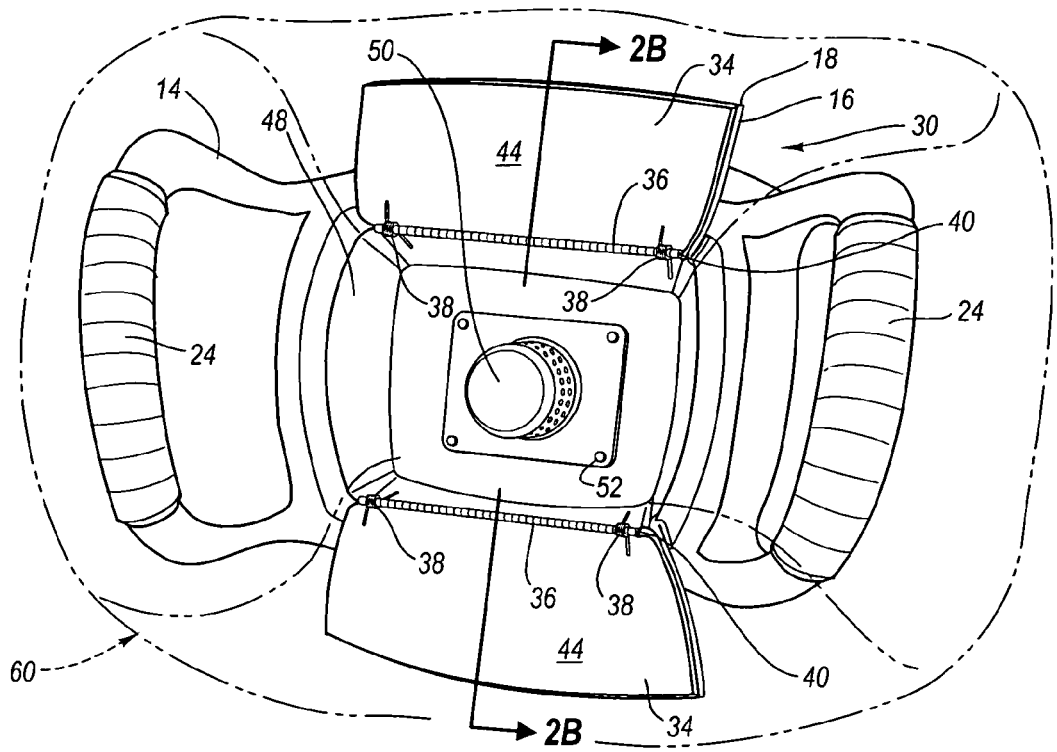
Fig. 2A
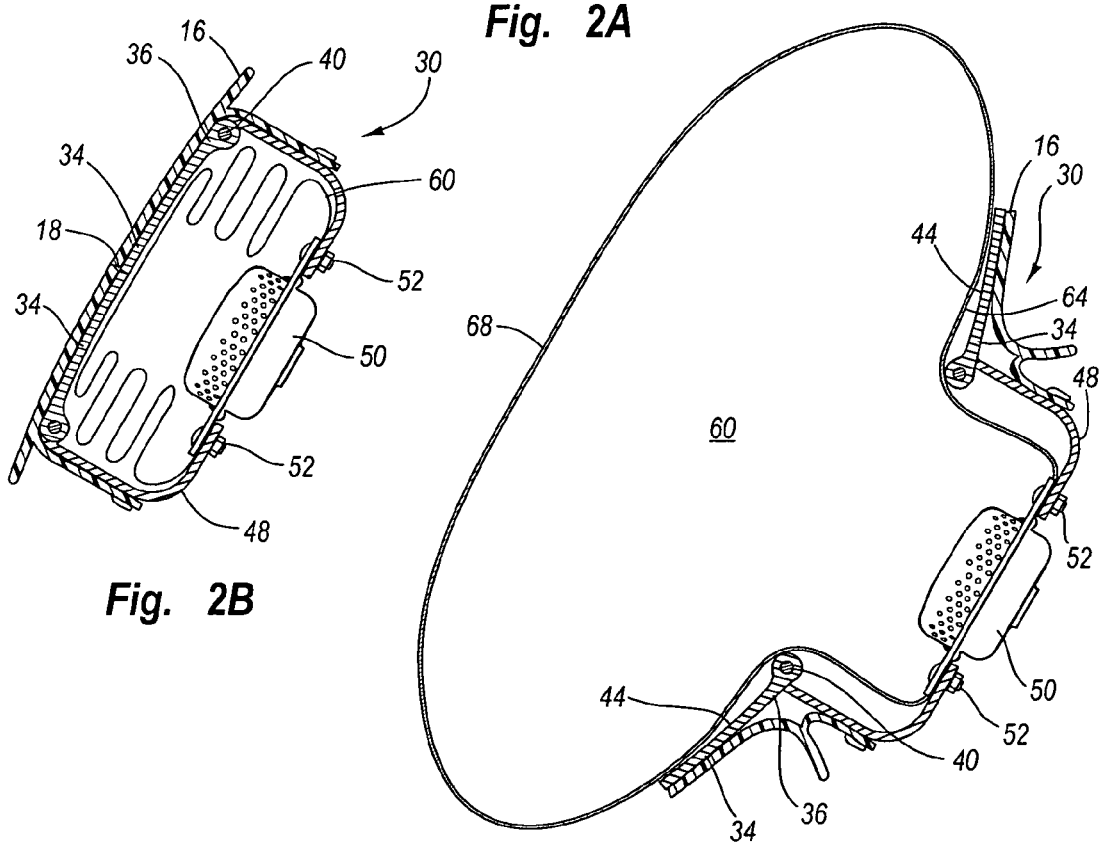
Fig. 2B
Fig. 2C

NON-CIRCULAR STEERING WHEEL ASSEMBLY AND AIRBAG MODULE

BACKGROUND OF THE INVENTION

1. Field of the Invention

The present invention relates to methods and apparatus for providing a non-circular steering wheel assembly and airbag modules suitable for use with non-circular steering wheels. More specifically, the present invention relates to non-circular steering wheel designs and to airbag housings, cushions and airbag modules for use in vehicles using non-circular steering wheels.

2. Description of Related Art

Safety belts are designed to protect the occupants of a vehicle during events such as automobile collisions. In low-speed collisions, the occupants are generally protected from impact with objects located inside the vehicle such as the windshield, the instrument panel, a door, the side windows, or the steering wheel by the action of the safety belt. In more severe collisions, however, even belted occupants may experience an impact with the car's interior. Airbag systems were developed to supplement conventional safety belts by deploying into the space between an occupant and an interior object or surface in the vehicle during a collision event. The airbag acts to decelerate the occupant, thus reducing the chances of injury to the occupant caused by contact with the vehicle's interior.

Many typical airbag systems consist of several individual components joined to form an operational airbag module. Such components generally include an airbag cushion, an airbag inflator, a sensor, and an electronic control unit. Airbag cushions are typically made of a thin, durable fabric that is folded to fit into a compartment of a steering wheel, dashboard, interior compartment, roof, roof rail, roof compartment, or other space in a vehicle. The airbag inflator is in fluid communication with the airbag cushion, and is configured to produce a gas to inflate the cushion when it is needed. The sensors detect sudden decelerations of the vehicle that are characteristic of an impact. The readings taken by the sensors are processed in the electronic control unit using an algorithm to determine whether a collision has occurred.

Upon detection of an impact of sufficient severity, the control unit sends an electrical signal to the inflator. The inflator uses one of many technologies, including pyrotechnic compounds and pressurized gas, to produce a volume of an inflation gas. The inflation gas is channeled into the airbag, inflating it. Inflation of the airbag causes it to deploy, placing it in a position to receive the impact of a vehicle occupant. After contact of the occupant with the airbag and the corresponding deceleration of the occupant, the airbag rapidly deflates. To accomplish this, the inflation gas is vented from openings in the airbag, deflating it and freeing the occupant to exit the vehicle.

As experience in the manufacture and use of airbags has increased, the engineering challenges involved in their design, construction, and use have become better understood. Most airbag systems are designed to rapidly inflate and provide a cushion in proximity to a vehicle occupant. Many such cushions are configured to be placed in front of a vehicle occupant. Placement of the cushions is determined based on presumptions made of the position of a vehicle occupant during normal operation of the vehicle. Thus, a vehicle occupant enjoys optimal protection from a specific airbag when the occupant is in the presumed range of positions when the airbag deploys.

In some situations, injuries have been noted to occur when the occupant is "out of position" with regard to the presumed position discussed above. Injuries similar to out of position injuries may also result from improper deployment of the airbag. Improper deployment may result in either poor placement of the cushion when contacted by a vehicle occupant or incursion of the airbag cushion into the space reserved for the vehicle occupant. Such incursion during deployment may raise the probability of injury to the vehicle occupant.

Automotive engineers have begun to incorporate "drive-by-wire" technologies into newer vehicles. These technologies eliminate a mechanical connection between the driver and a system of the vehicle by receiving and interpreting a driver's manual commands and electronically implementing them. One currently available example of this technology intervenes by receiving a driver's inputs from the accelerator pedal of a vehicle, interpreting them, and automatically adjusting the throttle in response.

Some drive-by-wire technologies are envisioned for use in the steering mechanisms of a vehicle. The use of some drive-by-wire steering systems would allow vehicle designers to replace the standard circular steering wheel used in most cars today with a non-circular design. Such non-circular designs often take a rectangular form similar to the geometries of currently-used aircraft steering apparatus. This design presents several safety engineering challenges left unaddressed by current airbag designs and configurations.

A first challenge is presented by the fact that the function of current steering wheel-mounted airbag cushions is generally reliant on the presence of a circular steering wheel. More specifically, commonly-used cushions have a substantially circular shape which overlaps the steering wheel when inflated. The steering wheel-facing surface of the airbag cushion abuts the surface of the steering wheel when inflated and contacts the surface of the steering wheel when an occupant strikes the cushion. The steering wheel provides a reaction force to the airbag cushion, supporting it.

When a steering wheel has a non-circular shape, however, the steering wheel may not be able to provide sufficient support to the cushion. In one example, when the steering wheel has a flattened-rectangular geometry similar to that used in aircraft, the use of a generally circular airbag cushion is problematic because the cushion has no reaction surface at the 12:00 and 6:00 positions. The application of a load to the occupant-facing portion of the cushion could cause the cushion to fold.

Accordingly, a need exists for non-circular steering wheel designs and for airbag housings, cushions and modules for use in vehicles using non-circular steering wheels. Such non-circular steering wheel designs and airbag module housings, airbag cushion designs and airbag modules for use in vehicles using non-circular steering wheel designs are provided herein.

SUMMARY OF THE INVENTION

The apparatus and method of the present invention have been developed in response to the present state of the art, and in particular, in response to the problems and needs in the art that have not yet been fully solved by currently available non-circular steering wheels, airbag module housings, airbag cushion designs and airbag modules for use in vehicles using non-circular steering wheel designs. Thus, the present invention provides novel non-circular steering wheels, airbag module housings, airbag cushion designs and steering wheel-mounted airbag modules for use in vehicles using non-circular steering wheel designs.

In accordance with the invention as embodied and broadly described herein, non-circular steering wheel designs are provided which include deployable reaction surfaces for providing a reaction force to an airbag cushion. According to the invention, such steering wheels include at least one handle made up of first and second handle portions. The handle portions are releasably connected to each other and attached to the steering wheel in a hinged fashion. In some configurations of the steering wheels of the invention, the hinges are spring hinges to aid in deployment of the handle. As a result, the first and second handle portions separate on deployment to provide a more evenly distributed reaction surface for an airbag cushion. Some such steering wheel designs according to the invention include at least two handles. In some variations of the invention, the first and second handle portions are linked by handle locks. Such handle locks hold the handle portions together. The handle locks may be configured to be disengaged by a release mechanism. Suitable release mechanisms may include mechanisms such as solenoid switches or pyrotechnics.

In other embodiments of the non-circular steering wheel designs of the invention, the handles may further include a sheet of material such as webbing which may be deployed by the first and second handle portions of the handles of the steering wheel to provide a supplemental reaction surface. This deployable material may be housed in either or both of the housing portions and then drawn out between the first and second handle portions when they are deployed, thus providing an additional reaction surface for an airbag cushion. Some steering wheel designs may include multiple such sheets of material to be deployed from individual handles. Alternatively, such sheets of material may be deployed between handles of the steering wheel to provide additional reaction surfaces.

The invention further provides non-circular steering wheel assemblies for use in vehicles. According to the invention, such steering wheel assemblies may include components according to the invention that are suitable for use with non-circular steering wheels. These steering wheel assemblies may include components including, but not limited to, non-circular steering wheels such as those described above, an airbag module mounted to the steering wheel and a deployable reaction surface for providing or receiving a reaction force for an airbag cushion component of the airbag module. The deployable reaction surfaces are placed to deploy into a position about the steering wheel not occupied by a portion of the steering wheel and below a space occupied by the airbag cushion when inflated. The airbag module according to the invention may generally include an airbag inflator, an inflatable airbag cushion and an airbag module housing.

The deployable reaction surface of the steering wheel assembly of the invention may first be a component of the airbag module. As such, the deployable reaction surface may be a hinged portion of the airbag housing designed to deploy with the airbag cushion and provide a supplemental reaction surface for the airbag cushion. This deployable reaction surface may take the form of an airbag module door positioned about the airbag cushion of the airbag module. This door may be hinged to deploy outwardly to a specific angle or position. The doors may incorporate spring hinges to ease deployment. Such doors may still further incorporate locking hinges which permit deployment to a predetermined position or angle, and then support the doors. Some airbag modules of the invention include two such module doors. In some circumstances, the number of such deployable reaction surfaces may be increased or decreased to modify the amount of supplemental support provided. In some specific airbag modules of the invention, the deployable reaction surfaces are positioned to deploy substantially at the 12:00 and 6:00 positions of the steering wheel.

The steering wheel assembly of the invention may alternatively employ an airbag cushion configured to exploit portions of the steering wheel, steering column and steering wheel shroud of the vehicle as reaction surfaces. More specifically, airbag modules according to the invention may include airbag cushions with reaction arm portions designed to deploy substantially away from a vehicle occupant to abut portions of the steering wheel, steering column, and steering wheel shroud. Such airbag cushions may include an occupant face for contact with a vehicle occupant and reaction arms for contact with the portions of the vehicle listed above. When the cushion is contacted by a vehicle occupant, the reaction arm portions transmit a portion of the impact force to the surfaces of the steering wheel, steering column, and steering wheel shroud. In turn, these surfaces provide a reaction force to the airbag cushion. In some airbag cushions of the invention, a single reaction arm is present. In others, a pair of reaction arms is utilized. In some cases, such a pair of reaction arms may be placed at 12:00 and 6:00 positions of the steering wheel. In still other variations of the invention, more than two reaction arms are utilized and deployed about the steering wheel into spaces where the steering wheel provides little reaction surface.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2A is an isolated perspective view of a steering wheel assembly of the invention including an airbag module with the airbag cushion inflated and deployed (shown in phantom), illustrating a deployable reaction surface of the invention;

FIG. 2B is a cross-sectional view of the steering wheel assembly of FIG. 2A taken at line 2B-2B of FIG. 2A shown with the airbag cushion stowed and the deployable reaction surfaces in a stowed position;

FIG. 2C is a cross-sectional view of the steering wheel assembly of FIG. 2A taken at line 2B-2B of FIG. 2A shown with the airbag cushion inflated and deployed and with the reaction surfaces deployed;

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus and system of the present invention, as represented in FIGS. 1 through 4C, is not intended to limit the scope of the invention, as claimed, but is merely representative of presently preferred embodiments of the invention.

Trends in automotive engineering are currently driving the design and production of vehicles utilizing "drive-by-wire" technology, in which a driver's steering, acceleration, braking, and other inputs may be received electronically. These inputs are received and subsequently interpreted into instructions which can be transmitted and implemented by appropriate components of the vehicle. Such innovations may in some cases reduce or even remove the need to use circular steering wheels. This would free vehicle designers to explore non-circular and partially-circular steering wheel design options.

Despite these advancements, restraint systems such as airbag cushions will remain an integral part of the occupant protection scheme of a vehicle. The protection zone needed in vehicles with non-circular steering wheels will also likely remain substantially identical to that of circular steering wheels. Many currently known drivers' side airbags use the circular steering wheel as a support for airbag cushions. Because these airbag cushions often have an at least partially circular base region, the circular steering wheel serves as a support for the airbag cushion. As a result, when a force is applied to the airbag cushion, such as when an occupant strikes the cushion, the steering wheel provides a reaction force to the airbag, thus absorbing and dissipating the impact of the occupant.

Use of non-circular steering wheels changes the shape and amount of the surface area available as a support or "reaction" surface for an airbag cushion. Thus, use of traditional, circular driver airbag cushions may result in diminished deceleration of a vehicle driver and decreased protection. Specifically, because portions of the airbag cushion will not have a reaction surface, these portions may fold over the steering wheel without cushioning the driver. Thus, many currently-used steering wheel-mounted airbag cushion and module designs are rendered ineffective and obsolete. The present invention thus provides non-circular steering wheel designs for use with circular cushions, as well as airbag housings, cushions and modules for use in vehicles with non-circular steering wheels.

Figure 1:
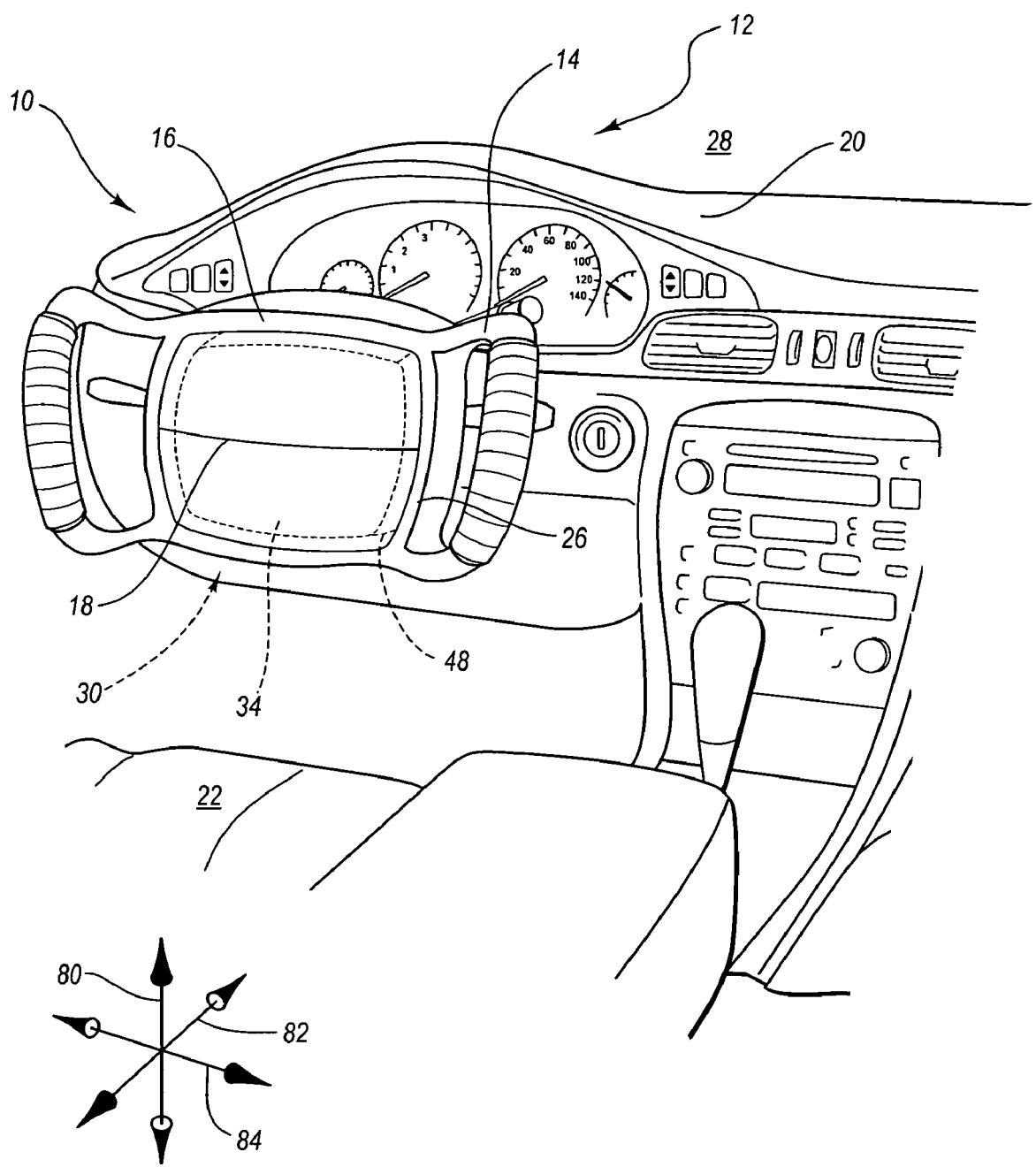
FIG. 1 is a partial isolated perspective view of the interior of a vehicle including a non-circular steering wheel assembly and an airbag module according to the invention.

FIG. 1 provides a partial perspective view of the interior of a vehicle 12 incorporating a non-circular steering wheel assembly 10, airbag module 30 and housing 48 of the invention. The vehicle 12 generally includes a steering wheel 14, instrument panel 20, and windshield 28 positioned forward of a vehicle occupant (not shown) in a longitudinal direction 82. A seat 22 is provided behind the steering wheel assembly 10 for the vehicle occupant.

The steering wheel assembly 10 illustrated in FIG. 1 includes a steering wheel 14 and an airbag module 30 (drawn in phantom). The steering wheel portion 14 of the steering wheel assembly 10 is shown to have a substantially rectangular shape, thus departing from more traditional substantially circular steering wheel designs. In this respect, the design of the steering wheel 14 more closely resembles the steering wheel of an aircraft. The steering wheel 14 includes a steering wheel body 26 and handles 24 which partially surround the airbag module 30. The steering wheel body 26 may be at least in part composed of the housing 48 of the airbag module 30. The airbag module 30 may be enclosed by a surface trim 16 to protect it and provide an aesthetically pleasing surface. The surface trim 16 of the steering wheel assembly 10 may include a tear seam 18 to allow the trim 18 to predictably separate to allow the doors 34 of the airbag module 30 to deploy outwardly upon initiation of the airbag module 30.

Referring next to FIG. 2A, the steering wheel assembly 10 of FIG. 1 is shown isolated from the vehicle 12 of FIG. 1. In FIG. 2A, the airbag module 30 of the assembly 10 is shown in its deployed configuration, with the airbag cushion 60 of the module 30 drawn in phantom in a plan view.

Upon deployment of the airbag module 30, the airbag inflator 50 produces an inflation gas (not shown) which enters the airbag cushion 60, causing it to expand. The inflator 50 and/or the airbag cushion 60 may be attached to the module 30 using attachments such as inflator attachments 52. As the cushion 60 expands, it forces the module doors 34 to open outwardly. The force of the opening module doors 34 causes the surface trim 16 of the steering wheel 14 to tear apart. In some embodiments of the invention, the surface trim 16 may include a tear seam 18, shown in FIG. 1. The tear seam 18 of FIG. 1 is shown to cross a central portion of the steering wheel 14 in a lateral direction 84. The tear seam 18 may additionally be extended in a substantially transverse direction 80 upwardly and downwardly to produce an "H"-shaped tear seam 18 which may approximate the edges of the module doors 34. This allows the surface trim 16 to efficiently and predictably separate to permit deployment of the doors 34 and airbag cushion 60.

The tear seam 18 may take the form of a welded seam designed to rupture upon the application of a force. Alternately, the tear seam 18 may take the form of a weakened region of the surface trim 16 designed to tear on the application of force. The tear seam 18 may still further comprise the joint of abutting components making up the surface trim 18 designed to part upon the application of a force. Such a joint could include an adhesive or other attaching means, or may alternately be a simple abutment of the components making up the surface trim 18.

Referring again to FIG. 2A, the module doors 34 are shown to have opened to a predetermined position, forcing the surface trim 16 to separate and peel back. The surface trim 16 may be selected from those known in the art which are generally frangible and/or flexible. Frangibility is desirable to allow the trim 16 to be separated when the airbag module doors 34 deploy. Alternately, the surface trim 16 may be constructed of a more durable material produced in sheets of similar dimensions to the module doors 34. Such sheets could separate and open to allow the deployment of the doors 34. Flexibility may be desirable to allow the surface trim 16 to bend from its initial position without breaking and being propelled into the passenger cabin of the vehicle.

The deployment of the module doors 34 of the airbag module 30 is guided by door hinges 36. In some embodiments, the door hinges include a shaft 40 passing through each of the hinges 36. The hinges 36 may further include springs 38 biased to aid opening of the doors 34. As shown, the doors 34 open to expose reaction surfaces 44. These reaction surfaces 44 may provide a reaction force to an airbag cushion 60 in response to a force placed on the cushion 60. The reaction surfaces 44 thus combine with the handles 24 of the steering wheel 14 to provide a reaction force to the airbag cushion 60.

Referring next to FIG. 2B, a cross-sectional view of the steering wheel assembly of FIG. 2A is provided which is taken at line 2B-2B of FIG. 2A. In FIG. 2B, the airbag module 30 is shown in its stowed configuration with the airbag cushion 60 folded and positioned inside of the module 30. A module housing 48 is shown to enclose the airbag inflator 50 and the airbag cushion 60. The airbag inflator 50 and the cushion 60 may be attached to the housing using attachments 52 or other means known in the art. The housing 48 further includes module doors 34 described above, which may be mounted on hinges 36. The hinges 36 are illustrated to include a hinge shaft 40. FIG. 2B further shows the airbag module 30 enclosed by a surface trim 16 which provides an aesthetically pleasing surface for the module 30 for mounting and use in a vehicle. The surface trim 16 may include a tear seam 18 or other suitable mechanism to provide predictable separation of the surface trim 16 during deployment of the cushion 60.

FIG. 2C shows the cross-sectional view of the steering wheel assembly of FIG. 2B in its deployed configuration. In this configuration, the airbag cushion 60 is inflated and the module doors 34 are deployed. In FIG. 2C, the airbag cushion 60 has been inflated by the airbag inflator 50. In its inflated configuration, the airbag cushion 60 extends rearwardly in a longitudinal direction 82 toward the position occupied by a vehicle occupant.

FIG. 2C also illustrates the deployed configuration of the airbag housing 48. More specifically, FIG. 2C particularly illustrates the deployed configuration of the module doors 34. The airbag module doors 34 are shown having deployed by rotating at their hinges 36 approximately about the hinge shafts 40. In some embodiments of the invention, the module doors 34 may be configured to open to a specific angle or position and then to be stopped and supported in that position. In the configuration illustrated in FIG. 2C, the module doors 34 are seen to open until they abut a portion of the module housing 48. The module housing 48 then supports the module doors 34, allowing them to provide a reaction force to the airbag cushion 60 when it receives an impact. The module doors 34 are generally rigid structures, and may thus be constructed from a wide array of materials sufficiently rigid to substantially resist damage or deformation during deployment, displacement of the surface trim and cushion impact.

As shown in FIG. 2C, the airbag cushion 60 includes an occupant face 68 and a reaction face 64. The occupant face 68 is designed and constructed to receive an impact from a vehicle occupant during a collision event. The impact is transmitted by the cushion 60 to the handles 24 of the steering wheel 14 and to reaction surfaces 44 of the airbag module doors 34. The handles 24 and the module doors 34 provide a reaction force to stabilize and support the airbag cushion 60.

In the embodiment of the airbag module 30 of FIGS. 1-2C, the module housing 48 includes two module doors 34 which provide two additional reaction surfaces 44. According to the invention, the number and placement of the module doors 34, and thus the number of additional reaction surfaces 44 may be determined by evaluating the shape and size of the steering wheel 14 relative to the shape and size of the airbag cushion 60. Specifically in FIGS. 1-2C, the steering wheel 14 illustrated is substantially rectangular in shape, having handles 24 positioned approximately at the 9:00 and 3:00 positions, respectively. Since the airbag cushion 60 used in the airbag module 30 includes a substantially circular cushion reaction face 64, supplemental reaction faces 44 are provided in regions not having a supportive steering wheel structure such as a handle 24.

As a result, this embodiment of the airbag module 30 of the invention may be varied by changing the shape, size, number and position of the vehicle reaction surfaces 44 deployed by the module 30 to suit various non-circular steering wheel designs. Specifically, while the embodiment illustrated in FIGS. 1-2C includes two symmetrical module doors 34, the doors may be constructed in an asymmetrical fashion to accommodate a steering wheel design which provides non-symmetrical cushion support. In other embodiments having a more supportive steering wheel design, the airbag cushion 60 may require only a single additional vehicular reaction surface 44. In still other variants of the airbag module 30 more than two module doors 34 may be required to provide a sufficient vehicular reaction surface 44.

Figure 3A:
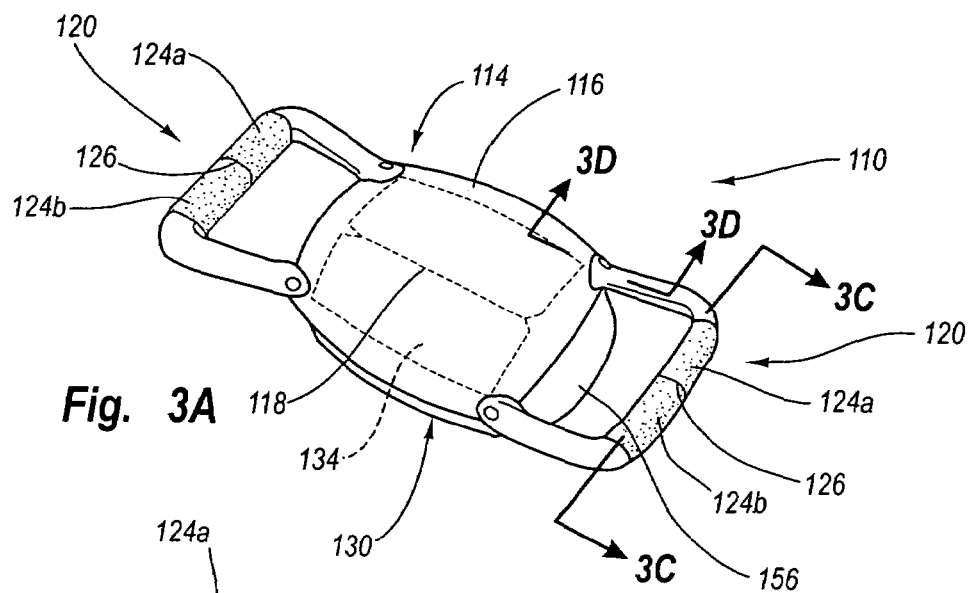
FIG. 3A shows an alternate embodiment of a steering wheel of the invention having deployable reaction surfaces present in handles of the steering wheel and in the airbag module, shown here with the deployable reaction surfaces in their stowed positions.

Referring next to FIG. 3A, a non-circular steering wheel design 114 of the invention having deployable reaction surfaces is shown. The steering wheel 114 is a component of a steering wheel assembly 110. The steering wheel 114 includes a body 156 and handles 120 positioned about its periphery. In this configuration, the handles 120 are positioned approximately at the 9:00 and 3:00 positions of the steering wheel 114. The steering wheel 114 further includes an airbag module 130 similar to that illustrated and discussed in connection with FIGS. 1-2C. The airbag module 130 of the steering wheel assembly 110 is enclosed by a surface trim 116. The steering wheel 114 is configured to provide expanded reaction surfaces by deploying the airbag module 130 and by deploying the handles 120 of the steering wheel 114. FIG. 3A shows the airbag module 130 and the handles 120 in their stowed configurations, which are suitable for normal use in navigating a vehicle.

Figure 3B:
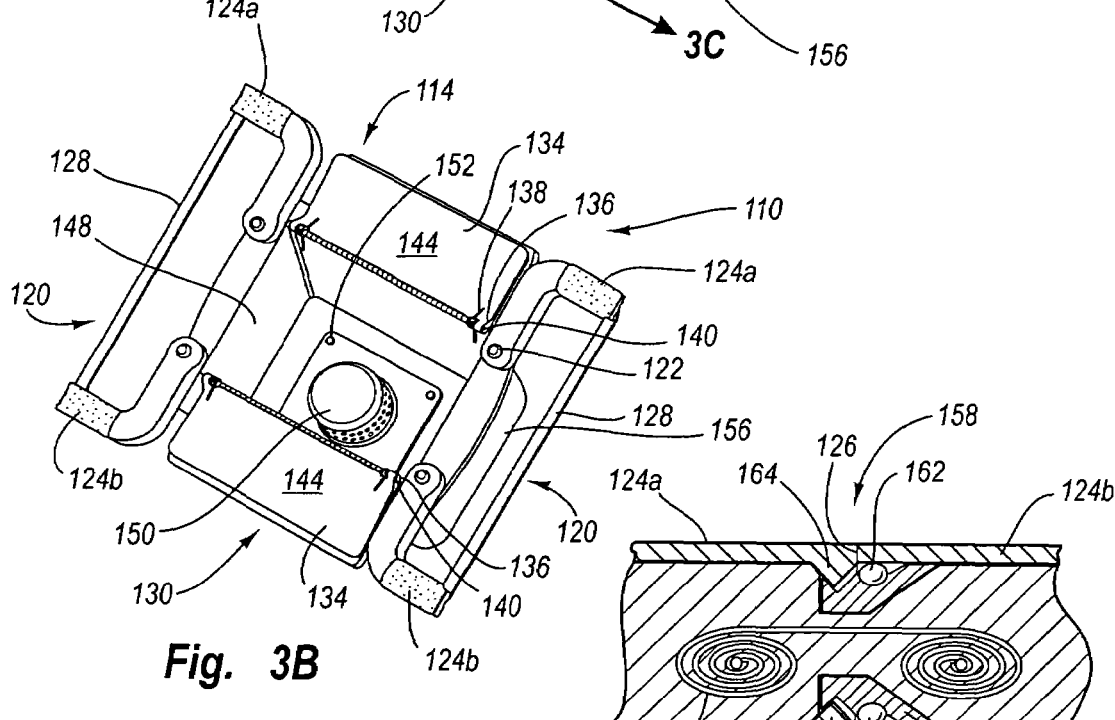
FIG. 3B shows the steering wheel of FIG. 3A with the deployable reaction surfaces of the handles of the steering wheel and the airbag module in their deployed positions.

In FIG. 3B, the airbag module 130 and steering wheel 114 are shown in their deployed configurations. In FIG. 3B, the airbag module 130 of the steering wheel 114 is shown to be substantially similar to that presented in FIGS. 1-2C. The module 130 includes a housing 148, and airbag inflator 150, doors 134 and an airbag cushion (omitted for clarity). Specifically, the module 130 includes doors 134 which deploy outwardly to provide additional reaction surfaces for the airbag cushion (not shown). The doors 134 include hinges 136 which may include a hinge shaft 140. The module doors 134 may further include springs 138 to aid their deployment.

When deployed, the module doors 134 provide reaction surfaces 144 for an airbag cushion (omitted for clarity). The doors 134 are configured to deploy through the surface trim 116 covering the steering wheel 114. The surface trim 116 may include tear seams 118, as illustrated, which facilitate the deployment of the module doors 134. When the airbag module 130 is deployed and the doors 134 are opened, the trim 116 is parted and folded back out of the path of the deploying airbag cushion.

As shown in FIG. 3B, the handles 120 of the steering wheel 114 are also constructed to augment the reaction surface provided to the airbag cushion (not shown). Specifically, the handles 120 are composed of upper handle portions 124a and lower handle portions 124b releasably joined at handle seams 126. The upper and lower handle portions 124a, 124b are also joined to the body 156 of the steering wheel 114 by hinges 122. Hinges 122 may include a pin 172, illustrated in FIG. 3D, and an optional spring 170 to aid separation of the upper and lower handle portions 124a, 124b. On deployment, the upper and lower handle portions 124a, 124b spring apart by rotating at handle hinges 122. FIG. 3B shows the airbag module 130 and handles 124a, 124b in their deployed configurations. Thus deployed, the handles 120 provide a more evenly-distributed reaction surface for an airbag cushion.

FIG. 3B further illustrates that the handles 120 may also deploy an additional reaction surface to provide additional support to an airbag cushion. In FIG. 3B, the handles 120 are illustrated in their deployed configuration, with a webbing 128 deployed between the upper and lower handle portions 124a, 124b of each handle 120. The webbing 128 or other suitable surface may be housed in either or both of the upper and lower handle portions 124a, 124b of the handles 120 and subsequently deployed for use as a reaction surface.

Figure 3C:
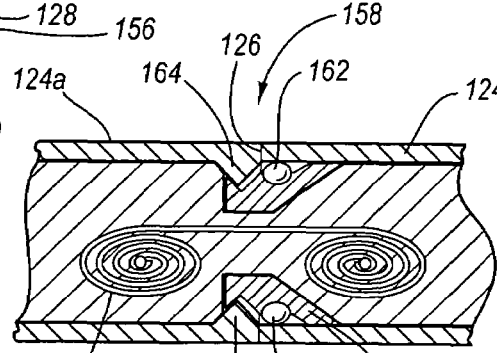
FIG. 3C is a partial cross-sectional view of the steering wheel of FIG. 3A from line 3C-3C of FIG. 3A showing the stowed handle-mounted deployable reaction surface and the locking mechanism of the handle portions of the steering wheel.

FIG. 3C shows a partial cross-sectional view of a handle 120 of the steering wheel assembly 110 taken at line 3C-3C of FIG. 3A. As discussed above, each handle 120 is composed of an upper handle portion 124a and a lower handle portion 124b which interface at a handle seam 126. During ordinary use, the upper and lower handle portions 124a, 124b are held together by a handle lock 158. As illustrated in FIG. 3C, the handle lock includes a locking flange 160 which engages a locking ridge 164. Although the locking ridge is shown positioned in the upper handle portion 124a and the locking flange 160 is shown positioned in the lower handle portion 124b in FIG. 3C, one of ordinary skill in the art will understand that such positioning may be reversed within the scope of the invention.

The handle lock 158 illustrated in FIG. 3C further includes a release mechanism 162 for aiding separation of the locking flange 160 from the locking ridge 164. The release mechanism 162 may take many forms within the scope of the invention. More specifically, the release mechanism 162 may include any of a variety of switches such as, but not limited to, electronic solenoid switches or pyrotechnic components configured to deploy upon initiation of the airbag module 130 of FIGS. 3A-3B to release the handle lock 158. Various alternate locking mechanisms known to one of ordinary skill in the art such as may be used within the scope of the invention.

As briefly mentioned above, the handle 120 may further include a webbing 128. The webbing 128 is configured to be stored in the handles 120 during ordinary use of the vehicle and then to be deployed between the upper and lower handle sections 124a, 124b when the handle 120 is deployed. This webbing 128 then provides an additional reaction surface for an airbag cushion. The webbing 128 is illustrated to provide a substantially flat surface when deployed. Webbing such as 128 may provide such a surface while having less weight than a solid sheet of material of a similar size. In some configurations, however, using a solid sheet of material may provide a more durable reaction surface without adding significant weight. Other analogous structures known to one of skill in the art which may be stored in a space such as either or both of the upper and lower handle portions 124a, 124b and subsequently deployed may be substituted for the webbing 128 illustrated. In FIG. 3C, the webbing is shown rolled or spooled for storage. Other storage methods, including but not limited to folding and random compaction folding known to one of ordinary skill in the art are included within the scope of the invention.

Figure 3D:
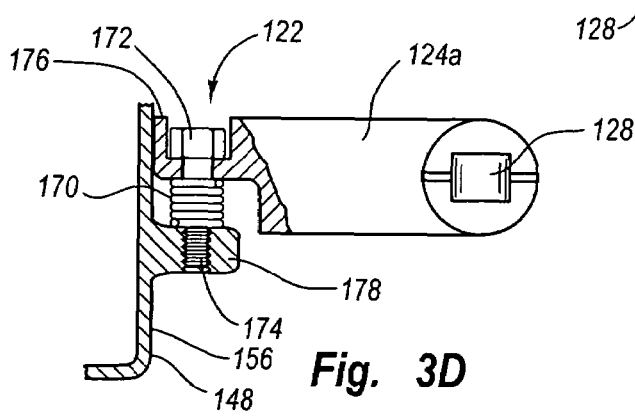
FIG. 3D is a partial cross-sectional view of the steering wheel of FIG. 3A from line 3D-3D of FIG. 3A showing the hinge mechanism of the handle portions of the steering wheel.

Referring next to FIG. 3D, a partial cross-sectional view of the steering wheel 114 of FIG. 3A is shown taken at line 3D-3D of FIG. 3A. FIG. 3D provides a view of the hinge mechanism 122 of the upper and lower handle portions 124a, 124b of the handles 120 of the steering wheel 114. As noted above, upon deployment, the upper and lower handle portions 124a, 124b are separated at the handle seam 126. The handle portions 124a, 124b rotate away from each other about hinges 122. In FIG. 3D, the hinges 122 are first shown to include a pin 172, here illustrated as having screw threads 174. The hinges 122 also include a hinge mounting loop 176 for receiving the pin 172. The steering wheel 114 further includes a handle mount 178 for receiving the pin 172. The handle mount 178 may be a portion of the steering wheel body 156, which may in turn be composed of the airbag housing 148. Other hinge structures known to one of ordinary skill in the art may be suitable for use with the steering wheel 120 of the invention, and are thus included in the scope of the invention. The hinges 122 may also further include a spring 170 to aid deployment of the handle portions 124a, 124b.

Figure 4A:
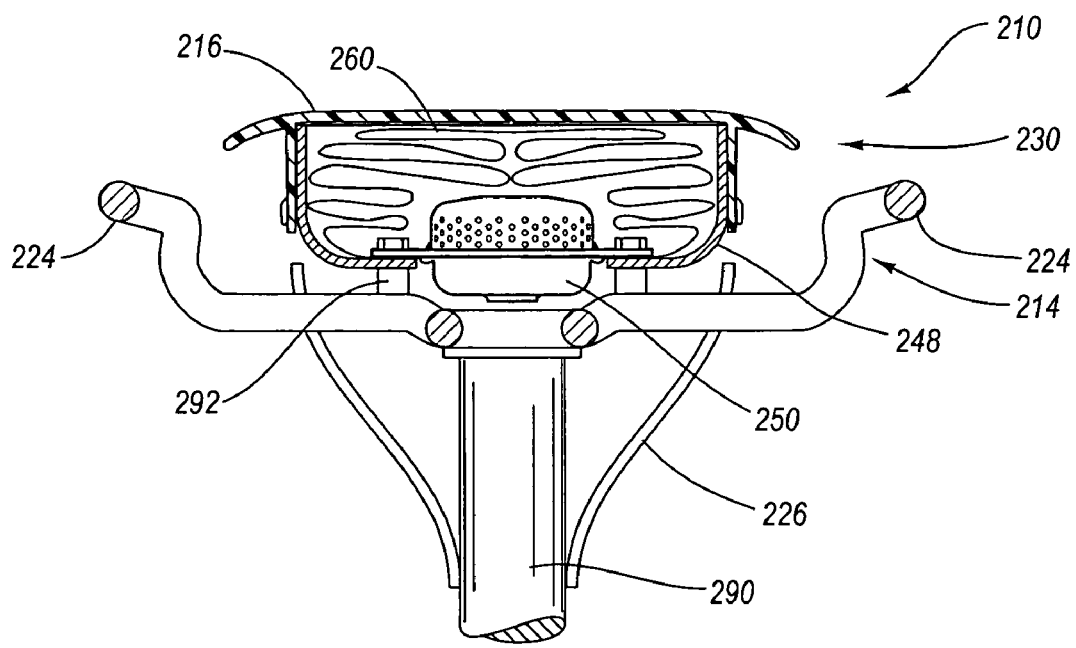
FIG. 4A is an cross-sectional view of a steering wheel similar to that illustrated in FIG. 3A, but including an alternate embodiment of an airbag module of the invention.

Referring next to FIG. 4A, a cross-section of another steering wheel similar to that illustrated in FIG. 3 is shown. In FIG. 4A, the steering wheel assembly 210 includes a steering wheel 214 and an airbag module 230. The steering wheel 214 includes handles 224, an extended steering wheel shroud 226, and a steering column 290. The airbag module 230 is mounted to the steering column 290 using supports 292. The airbag module 230 includes surface trim 216, an airbag cushion 260, a housing 248, and an inflator 250. As previously discussed, such a surface trim 216 may either simply be frangible, or may include a tear seam 218. Such a tear seam 218 is designed to part upon deployment of the cushion (not shown) of the airbag module 230 to allow the cushion to deploy and protect a vehicle occupant. The steering wheel shroud 226 extends upwardly from the handles 224 toward the airbag module 230 and downwardly to contact the steering column 290.

Figure 4B:
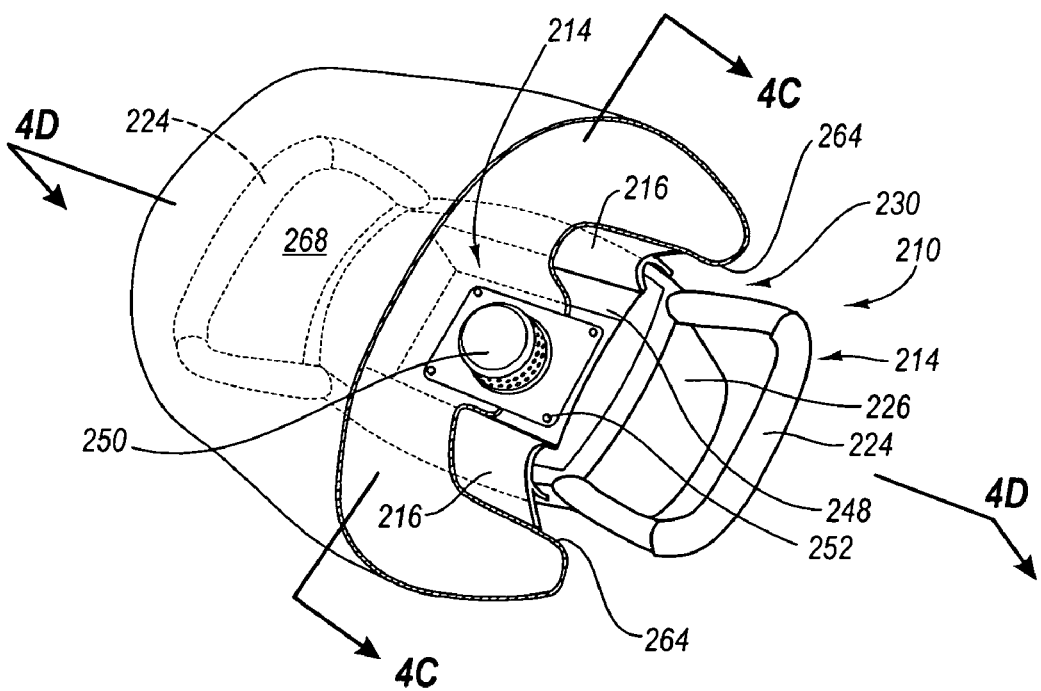
FIG. 4B is an isolated, partially cutaway perspective view of the airbag module of FIG. 4A in which the inflatable airbag cushion of the airbag module is shown inflated and deployed.

FIG. 4B illustrates a partially cutaway perspective view of the steering wheel assembly 210 of FIG. 4A. In FIG. 4B, the airbag module 230 is shown to include a housing 248, to which an airbag inflator 250 has been mounted. The module 230 further, includes an airbag cushion 260, shown partially cut away for clarity, which deploys outwardly from the module 230 to provide support to a vehicle occupant.

The airbag cushion 260 includes an occupant face 268 and reaction arms 264. The occupant face 268 is positioned to receive an impact from a vehicle occupant. The reaction arms 264 are provided and positioned to extend about portions of the steering wheel 214 to abut or engage the steering wheel shroud 226. Thus positioned, the reaction arms 264 of the airbag cushion 260 recruit those portions of the steering wheel shroud 226 and handles 224 of the steering wheel 214 to be reaction surfaces. As a result, when the cushion 260 receives an impact from a vehicle occupant, the impact force is transmitted through the cushion 260 to the handles 224 of the steering wheel 214 and to those portions of the steering wheel shroud 226 and steering column 290 abutted by the reaction arms 264 of the airbag cushion 260.

Figure 4C:
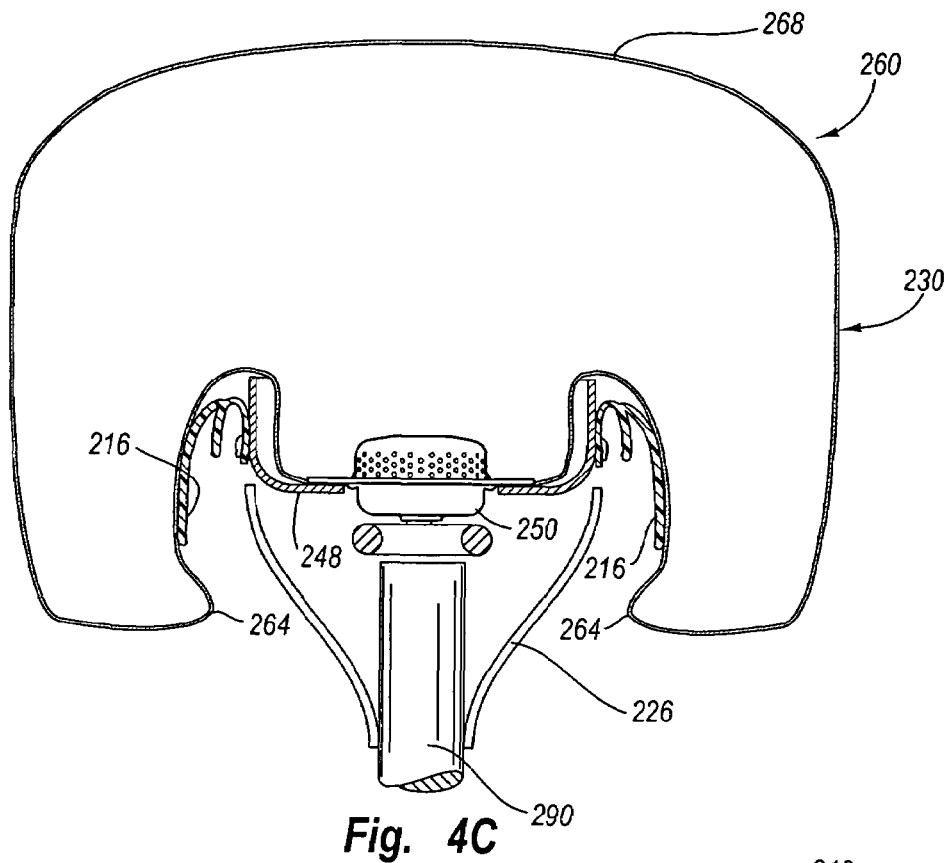
FIG. 4C is a cross-sectional view of the airbag module of FIG. 4B taken at line 4C-4C of FIG. 4B showing the shape of the inflatable airbag cushion of the airbag module.

The shape and configuration of the deployed reaction arms 264 is further illustrated in FIG. 4C, which is a cross-sectional view of the steering wheel assembly 210 of FIG. 4B taken at line 4C-4C. As illustrated in FIGS. 4B and 4C, the airbag module 230 may optionally have no module doors such as module doors 34 of FIGS. 1-2C, but instead be enclosed simply by surface trim 216, as illustrated in FIG. 4A. In FIGS. 4B and 4C, the surface trim 216 is shown to have separated and folded back against itself and toward the module housing 248. In FIG. 4C, the steering wheel module housing 248 is abutted by the steering wheel shroud 226 attached to the steering wheel 214. The airbag module 230 further includes an airbag cushion 260 and an airbag inflator 250. As briefly discussed above, the airbag cushion 260 of the airbag module 230 includes an occupant face 268 and reaction arms 264.

The reaction arms 264 of the airbag cushion 260 are shown to extend in a direction substantially opposite of the occupant face 268. Airbag cushions 260 according to this embodiment of the invention may be configured to include such reaction arms 264 which extend about the steering wheel 214 in regions where the steering wheel 214 provides either no reaction surface, or a reduced reaction surface. In the airbag module 230 illustrated in FIGS. 2B and 2C, the airbag cushion 260 includes reaction arms 264 extending about the 12:00 and 6:00 positions of the steering wheel 214 where there are no handles (such as at the 9:00 and 3:00 positions), and thus a greatly reduced reaction surface. The reaction arms 264 contact portions of the steering wheel shroud 226 and use it as the needed reaction surface.

Figure 4D:
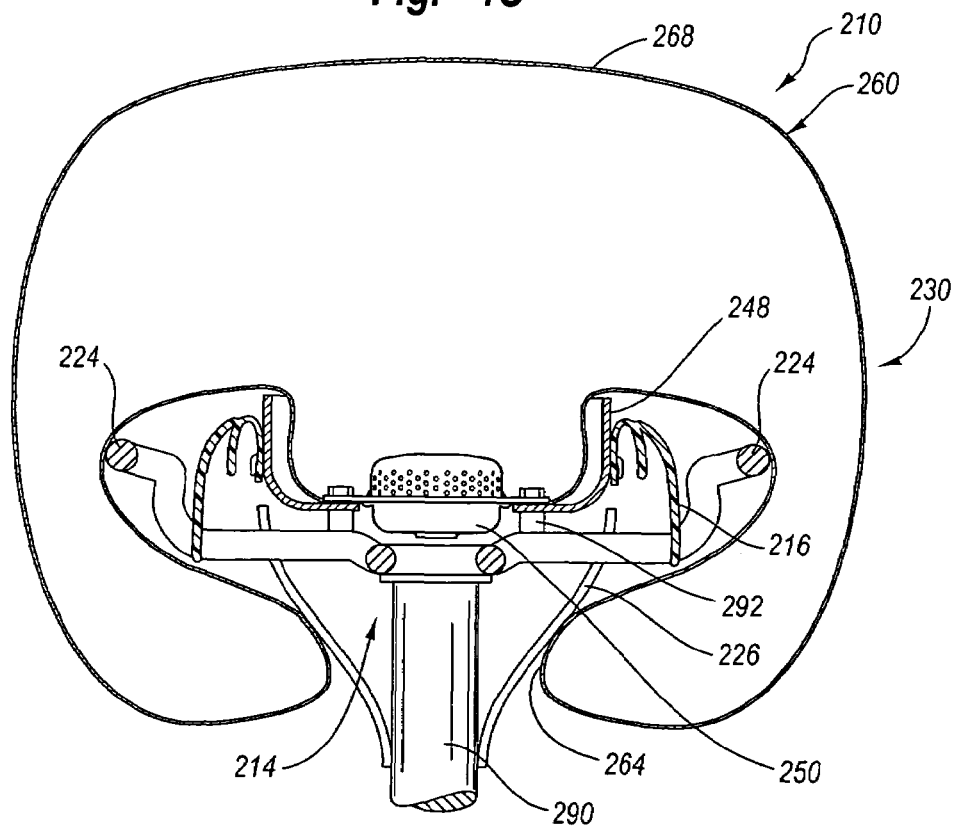
FIG. 4D is a cross-sectional view of the airbag module of FIG. 4B taken at line 4D-4D of FIG. 4B showing the shape of the inflatable airbag cushion of the airbag module in a plane substantially perpendicular to that shown in FIG. 4C.

Referring next to FIG. 4D, a next cross-sectional view of the steering wheel assembly 210 of FIG. 4B taken at line 4D-4D. This cross-sectional view thus allows viewing of the interaction of reaction arms 264 and the inflated airbag cushion 260. In some embodiments of the airbag cushion 260 of the invention, the reaction arms 264 do extend about the handles 224 of the steering wheel 214 to contact portions of the steering wheel shroud 226. In other embodiments of the invention, regions such as the 9:00 and 3:00 portions of the steering wheel 214 do not include extended reaction arms 264, instead relying on the handle portions 224 of the steering wheel 214.

Airbag cushions 260 may be adapted for use with a wide variety of steering wheel designs by varying the size, number, and/or position of the reaction arms 264 of the airbag cushion 260. More specifically, within the scope of the invention, airbag cushions 230 may be adapted for use with many non-circular or partially-circular steering wheel designs by placing reaction arms 264 to deploy about regions of the steering wheel 214 where there is no supportive steering wheel component such as handles 224. Thus, in steering wheel designs 214 having more than two handles, the need for additional reaction arms 264 is reduced, in which case, a single reaction arm 264 may be sufficient to adequately support an airbag cushion 260.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A steering wheel assembly for a vehicle comprising:
a non-circular steering wheel;
an airbag module mounted to the steering wheel, the airbag module including an airbag inflator, an inflatable airbag cushion, and an airbag module housing; and
a deployable reaction surface for providing or receiving a reaction force for the airbag cushion when deployed and inflated, wherein the deployable reaction surface is a component of the steering wheel, and wherein the steering wheel includes a flexible sheet for deployment about the steering wheel to provide a reaction force to an airbag cushion.

2. The steering wheel assembly of claim 1, wherein the steering wheel includes handles, wherein the handles are comprised of first and second handle portions which separate to provide a more evenly distributed reaction surface for an airbag cushion.

3. The steering wheel assembly of claim 1, wherein the steering wheel includes at least two flexible sheets.

4. The steering wheel assembly of claim 1, wherein the flexible sheet is housed in at least one handle of the steering wheel, wherein the handle of the steering wheel is comprised of first and second handle portions that can separate to deploy the flexible sheet.

5. The steering wheel assembly of claim 4, wherein the first and second handle portions are separated by a pyrotechnic device.

6. The steering wheel assembly of claim 4, wherein the first and second handle portions are separated by an electronic solenoid switch.

7. A non-circular steering wheel comprising a deployable reaction surface for a steering wheel mounted airbag cushion, wherein the airbag cushion is housed within a housing, wherein the airbag module housing comprises moveable plates, wherein the non-circular steering wheel includes two handles comprised of first and second handle portions that separate to deploy the deployable reaction surface.

8. The non-circular steering wheel of claim 7, wherein the reaction surface is a flexible sheet.

9. The non-circular steering wheel of claim 7, wherein the reaction surface is a webbing.

10. The non-circular steering wheel of claim 7, wherein the grip portions are opened by a pyrotechnic device.

11. The non-circular steering wheel of claim 7, wherein the grip portions are opened by an electronic solenoid switch.

12. A non-circular steering wheel comprising two handles comprising first and second handle portions that separate to deploy two deployable reaction surfaces.

13. The non-circular steering wheel of claim 12, wherein the deployable reaction surfaces are flexible sheets.

14. The non-circular steering wheel of claim 12, wherein the deployable reaction surfaces are webbing.

15. The non-circular steering wheel of claim 12, wherein the grip portions are opened by a pyrotechnic device.

16. The non-circular steering wheel of claim 12, wherein the grip portions are opened by an electronic solenoid switch.

* * * * *